US008911593B2

(12) United States Patent
Ladret et al.

(10) Patent No.: US 8,911,593 B2
(45) Date of Patent: Dec. 16, 2014

(54) METHOD FOR THE CATIONISATION OF LEGUME STARCHES, CATIONIC STARCHES THUS OBTAINED APPLICATIONS THEREOF

(75) Inventors: Marika Ladret, Lompret (FR); Edmond Dobrogoszcz, Vermelles (FR); Hervé Gombert, Hinges (FR); Philippe Sabre, Saint Jans Cappel (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 12/718,251

(22) Filed: Mar. 5, 2010

(65) Prior Publication Data

US 2010/0155338 A1   Jun. 24, 2010

Related U.S. Application Data

(62) Division of application No. 10/555,288, filed as application No. PCT/FR2004/001143 on May 11, 2004, now abandoned.

(30) Foreign Application Priority Data

May 12, 2003   (FR) ..................................... 03 05714

(51) Int. Cl.
| | |
|---|---|
| *D21F 11/00* | (2006.01) |
| *D21F 13/00* | (2006.01) |
| *D21H 11/00* | (2006.01) |
| *D21H 13/00* | (2006.01) |
| *D21H 15/00* | (2006.01) |
| *D21H 17/00* | (2006.01) |
| *D21H 19/00* | (2006.01) |
| *D21H 21/00* | (2006.01) |
| *D21H 23/00* | (2006.01) |
| *D21H 25/00* | (2006.01) |
| *D21H 27/00* | (2006.01) |
| *C08B 31/12* | (2006.01) |
| *C09J 103/08* | (2006.01) |
| *C08L 3/08* | (2006.01) |
| *D21H 17/29* | (2006.01) |
| *C08B 31/00* | (2006.01) |
| *C08B 33/00* | (2006.01) |
| *C08B 35/00* | (2006.01) |
| *D21H 21/10* | (2006.01) |
| *D21H 21/18* | (2006.01) |
| *D21H 21/16* | (2006.01) |

(52) U.S. Cl.
CPC ............... *D21H 17/29* (2013.01); *D21H 21/10* (2013.01); *C08B 31/125* (2013.01); *D21H 21/18* (2013.01); *C09J 103/08* (2013.01); *C08L 3/08* (2013.01); *D21H 21/16* (2013.01)
USPC ................................ 162/165; 536/45; 536/47

(58) Field of Classification Search
CPC ......... C08B 31/125; C08L 3/08; D21H 19/54
USPC ........................................ 162/135; 536/45, 47
See application file for complete search history.

(56) References Cited

U.S. PATENT DOCUMENTS

| | | | |
|---|---|---|---|
| 3,017,295 A * | 1/1962 | Outterson et al. | ............ 428/337 |
| 3,422,087 A | 1/1969 | Caesar | |
| 3,996,060 A | 12/1976 | Johnson | |
| 3,996,061 A | 12/1976 | Johnson | |
| 4,127,563 A | 11/1978 | Rankin et al. | |
| 4,332,935 A | 6/1982 | Fischer et al. | |
| 4,613,407 A | 9/1986 | Huchette et al. | |
| 5,122,231 A | 6/1992 | Anderson | |
| 5,129,989 A | 7/1992 | Gosset et al. | |
| 6,841,039 B1 | 1/2005 | Lokietek et al. | |
| 2002/0139501 A1 | 10/2002 | Vrbanac et al. | |
| 2002/0170693 A1 | 11/2002 | Richardson et al. | |
| 2004/0112559 A1 | 6/2004 | Du Bourg et al. | |

FOREIGN PATENT DOCUMENTS

| | | |
|---|---|---|
| EP | 0139597 A1 | 5/1985 |
| EP | 0282415 A1 | 9/1988 |
| EP | 0620121 A2 | 10/1994 |
| FR | 2434821 | 3/1980 |
| GB | 2063282 | 6/1981 |
| GB | 2071128 B | 9/1981 |
| JP | 2001115121 A | 4/2001 |
| JP | 2002517637 | 6/2002 |
| JP | 2003515015 T | 4/2003 |
| WO | 96/09327 | 3/1996 |
| WO | 9710385 A1 | 3/1997 |
| WO | 9964677 | 12/1999 |
| WO | 0138635 A1 | 5/2001 |
| WO | 01/96403 | 12/2001 |
| WO | 0214602 A1 | 2/2002 |
| WO | 02/074814 | 9/2002 |

OTHER PUBLICATIONS

C. Yook et al: "Effects og cationization on functional properties of pea and corn starches" Starch-Stärke, vol. 46, No. 10, 1994, pp. 393-399, XP008043814 p. 394, paragraphs 1, 2.3 p. 395; table 1.

(Continued)

*Primary Examiner* — Scarlett Goon
(74) *Attorney, Agent, or Firm* — Young & Thompson

(57) ABSTRACT

A novel solvent-free method for the cationization of a legume starch, and uses of the cationic starches thus obtained, in aqueous compositions and the paper industry, including the folding carton or paper thus obtained.

7 Claims, No Drawings

(56) References Cited

OTHER PUBLICATIONS

Ratnayake, W.S., Hoover, R., Warkentin, T. (2002) Pea Starch: Composition, Structure and Properties—A Review. Starch/Starke, vol. 54, p. 217-234.

Han, J.-Y., Tyler, R.T. (2003) Characterization of Pea Starches in the Presence of Alkali and Borax. Starch/Starke, vol. 55, p. 457-463.

Kweon et al., "An Aqueous Alcoholic-Alkaline Process for Cationization of Corn and Pea Starches", Starch/Starke, 1996, vol. 48, No. 6, pp. 214-220.

Sosulski et al., "Functional Properties of Cationic Pea Starch", Starch Structure and Functionality: Proceedings of an International, 1997, pp. 36-41.

Whistler et al., "Production and Uses of Cationic Starches", Starch: Chemistry and Technology, 1967, vol. II, pp. 403-422.

Biochemistry Dictionary 4th Edition, Iwanami Publishing Inc., Apr. 10, 1997, p. 30-31.

Starch Chemistry Handbook, Asakura Publishing Inc, Mar. 1, 1978, p. 160.

* cited by examiner

METHOD FOR THE CATIONISATION OF LEGUME STARCHES, CATIONIC STARCHES THUS OBTAINED APPLICATIONS THEREOF

CROSS REFERENCE TO RELATED APPLICATIONS

This application is a division of co-pending application Ser. No. 10/555,288 filed on Nov. 2, 2005, which is the 35 U.S.C. §371 national stage of International PCT/FR04/01143 filed on May 11, 2004, which claims priority to French Application No. 03/05714 filed on May 12, 2003. The entire contents of each of the above-identified applications are hereby incorporated by reference. Any disclaimer that may have occurred during prosecution of the above referenced applications is hereby expressly disclaimed.

The subject of the present invention is a method for the cationization of a legume starch in the absence of any organic solvent.

It also relates to the legume-derived cationic starches obtained according to said method, most of them constituting novel industrial products.

The present invention also relates to the uses of said legume-derived cationic starches, in particular in the paper industry, in the field known to persons skilled in the art as the wet end of the paper-making machine.

It finally relates to the folding cardboard or paper obtained by using these cationic starches.

The expression "legumes", for the purposes of the present invention, is understood to mean more particularly the Papilionaceae family, of which the most important representatives are the haricot bean, pea, lentil, broad bean, alfalfa, clove and lupine.

The expression "legume starch", for the purposes of the invention, is understood to mean the starches extracted from legumes, in particular from the pea, having a high starch content, in particular greater than 90% (dry/dry), accompanied by a generally low colloidal matter and fibrous residue content, for example of less than 1% (dry/dry).

The starch content is preferably greater than 95%, more preferably greater than 98% (dry/dry).

In parallel, the protein content is low, that is less than 1%, preferably less than 0.5%, and more particularly between 0.1 and 0.35% (dry/dry).

The cationization of cereal or tuber starches is extremely widespread, in particular for the production of cationic derivatives which are very useful in the paper industry.

The use of cationic corn starches is extremely common.

In a first instance, low degrees of substitution were sufficient, corresponding to the use of cationic starches in quite open circuits of paper-making machines.

With the acceleration of the recycling of water and the closure of said circuits, which was necessary in order to respond to the rise in the constraints and demands linked to the quality of the environment, the need to substantially, or even very substantially, increase the degrees of substitution of these cationic corn starches appeared increasingly pressing.

Gradually, during the change thus generated affecting the practical aspects of the manufacture, in its entirety, of the various qualities of folding cardboard and paper, the inadequacies of these corn starch-based cationic derivatives became more obvious.

In the first place, the modest reactivity of the corn starches toward tertiary amines and quaternary ammonium derivatives used causes, for relatively high degrees of substitution, low yields which are hardly compatible by virtue of the large presence of reactive residues, and from the environmental point of view, with the legislation and its increasing severity.

The possibility offered to carry out the reaction in a dry phase does not improve the yields and in fact does not reduce the residual quantities of reagent generated.

In addition, during use, persons skilled in the art are often forced, for good efficacy of the cationic corn starch, to delay the point at which it is added to the fibrous suspension in order to substantially increase the duration of contact between said starch and the cellulose before arrival in the headbox of the paper-making machine and the formation of said paper.

This increase is all the more justified if the attachment of the cellulose becomes difficult because of the closed circuit, if the recycling rate is high, these factors having to be correlated with a mechanical weakening of the fiber and with a degradation of its receptivity toward the cationic starch, in particular in comparison with certain other bases.

Wheat starch, in parallel, exhibits similar disadvantages.

In the meantime, starches, in particular from hybrid corn, have been developed which are rich in amylose or in amylopectin. Their cationic derivatives generate identical problems, in addition to their generally high cost.

The cationization of potato starch is technically more satisfactory. The reaction yields are substantially higher and make it possible to reduce the quantity of reaction residues and to more easily increase the degrees of substitution.

However, a first disadvantage in their use may lie in that sols of cationic potato starch require, unlike cereal starches, an addition to the fibrous suspension as close to the headbox as possible.

From a completely different point of view, it is observed that the supply of potato starch is becoming difficult, mainly because of the costs of extraction and the regulations applied to them.

Other sources of starch may be envisaged, such as rice and cassava. They are still, most often, difficult to obtain and/or of irregular quality.

Conscious of these problems, the applicant has already sought, in the past, solutions of interest.

In particular, European patent EP 0 139 597 describes bulk paper additives made from mixtures of at least one cationic cereal starch and at least one cationic tuber starch. Surprisingly and unexpectedly, these are capable of exhibiting synergies, in particular in terms of physical and retention characteristics.

However, it is clear that said mixtures, whether they are produced from starches subjected together or separately to the action of the cationic reagent, generate additional difficulties in the management of the raw materials and the manufacture.

Thus, a real need exists to search for other sources of starch which are easily accessible, easy to process, in particular in the context of satisfactory reaction yields and which have at the very least, after cationization, the capacity for rapid, strong and solid attachment to cellulose, whether the latter is from a noble source or from a recycled source, even in the context of very closed paper circuits.

Further, the need remains obviously pressing for possible sources of starch intended to be functionalized in this manner, to better satisfy all the specifications and all the properties that the person skilled in the art may expect from cationic starches.

Accordingly, in the very context of the common use of cationic starches in bulk, by adding it at the inlet of the headbox of the paper-making machine or, optionally, by introduction at a point situated upstream thereof, in the machine chest or in the mixing chest, or even in the pulper or in the broke chest, a cationic starch should find its justification in the improvement of at least one group of characteristics of interest relating to:

a satisfactory or even optimum retention of the fine fibers and the fillers, in particular inorganic fillers, ensuring a suitable equilibrium of the circuit, and for a good balance, in particular a good economic balance for the materials, a rapid draining of the fibrous cushion, directly linked to the speed of the machine, its performance and its energy balance, mechanical characteristics of the paper, of which the main ones are the tensile or bursting strength, the internal cohesion or alternatively the stiffness, the roughness or the smoothness, optical properties of the paper, such as for example the whiteness, the opacity or possibly the brightness of the paper, the printability of the paper, determined by measurements of intensity, reproduction or contrast of colors or by the resistance to picking of the surface fibers, the obtaining of a satisfactory degree of so-called paper sizing, characterizing the hydrophobic character, estimated by generally simple tests such as Cobb sizing or ink sizing.

On the latter point, the sizing agent used remains the major factor in the quality of paper sizing, whether in general this involves an agent which is reactive with cellulose or not.

The efficacy of said sizing agent is however particularly dependent on the quality of the composition generally marketed in the form of a dispersion, its keeping qualities over time and the stability and efficacy of the emulsion in the form in which it is added to the fibrous suspension.

In this context, the cationic starches commonly used as protective colloids in said dispersions and emulsions, are greatly involved in their properties.

In a very similar approach, the cationic starches may also be combined, for example, with optical brighteners or with dyes in order to improve the efficacy and the yield thereof, with synthetic polymers such as polyacrylamides or polyvinylamines, in particular in the context of the development of advantageous synergies.

In other contexts, in particular in other paper-making contexts, cationic starches, which have been optionally hydrolyzed and which may thereby have relatively low weight-average molecular masses, generally having from average to high degrees of substitution (or nitrogen levels), in the form of solid, liquid or pasty compositions, for example in the form of a free-flowing powder, an emulsion or a colloidal solution, have become commonly used as secondary additive for paper-making or as additive for the treatment of water for industrial use.

The expression "secondary additive for paper-making", for the purposes of the present invention, is understood to mean any additive other than a conventional main bulk additive, useful as an agent for reducing interfering substances, in particular of an anionic nature, contained in water circuits and/or retained on the equipment for paper-making processes.

The expression "additive for treating water for industrial use", for the purposes of the present invention, is understood to mean in particular any composition which is useful in particular as an agent for clarifying and/or purifying water derived from human or industrial activities or intended for said activities, such as for example water intended for use as foodstuff for humans or animals, waste from the textile and leather industries, the paper and cardboard industries, the ore extraction industries, and the food and slaughter industries.

Compared with the various sources of starchy materials from cereals and tubers, those from the legume starches, in particular from peas, are capable of satisfying the main requirements and may be considered as being easily accessible, under good, in particular economical, conditions.

Up to now, to the knowledge of the applicant, there were few studies relating to the cationization of starches obtained from legumes.

International patent application WO 97/10385 describes, in its example 4, the use of a ground pea flour, treated with α-amylase, corresponding to a declared protein content of 10 to 15%.

European patent EP 0 620 121 describes the very particular use of pea starch in carbonless auto-copy papers.

In the same quite specific field of application, U.S. Pat. Nos. 3,996,060 and 3,996,061 prefer a classified pea starch.

In the context of these pressure-sensitive "NCR" papers, the starch is used in the granular state. It is optionally crosslinked in order to ensure this state, but in any case there is no need for cationic starches.

International patent application WO 96/09327 describes a method of cationization which may involve, among other starchy materials and in particular waxy corn starches, pea starch using, as a reaction medium, a mixture of water and a water-miscible solvent, preferably an alcohol, in particular ethanol, the latter being used in large proportions, preferably of between 35 and 75% of the water and alcohol total.

In the cited document, the use of a water/organic solvent binary system, the only one claimed, is justified by the propensity which some starches have to gelatinize, at least partially, during modification in a completely aqueous medium.

Such a gelatinization, even partial, is effectively unacceptable, in particular for the reasons mentioned in the document, relating to the filtration and/or centrifugation behavior. It is found here to be very high for waxy corn starch, and limited but real with pea starch.

Persons skilled in the art must commonly ensure the absence of swelling of the starch in the alkaline reaction medium by adding salts such as sodium chloride or sulfate to said medium.

This patent application recommends instead, on the pretext of the need to recover the swelling inhibitor, the compulsory use of an organic solvent and consequently claims only systems combining it with water.

Cationization in the dry phase is also rejected because of the heterogeneity which it is said to bring about because of a reportedly limited conversion at the surface of the granules.

More generally, it is understood on reading the document that it is not easy to confer a cationic character on a pea starch according to simple and conventional procedures in a dry, semi-dry or aqueous medium.

It is understood in particular that it is already difficult to obtain a degree of substitution as low as 0.034 in an aqueous medium.

It is also understood that, in the context of the reaction in an aqueous-alcoholic medium, it is not easy to obtain a high degree of substitution, which constitutes a major disadvantage to its implementation in practice.

The article entitled "Functional Properties of Cationic Pea Starch", from "Proceedings of an International Conference: Starch Structure and Functionality"—1997, pages 36 to 41, produced by the University of SASKATCHEWAN confirms, if need be, this difficulty by exhibiting only degrees of substitution (DS) of 0.02, 0.04 and 0.06, that is nitrogen levels in the region of 0.15%, 0.3% and 0.45%, respectively, which constitute low conversion levels, in particular compared with the cationic density which starch must nowadays have in order to be effective in the context of the management of very closed circuits and/or of highly recycled cellulose.

It is thus to the applicant's merit to have been able to determine that it was quite possible to carry out a reaction intended to functionalize a pea starch in order to make it cationic, whether in the dry, semi-dry or aqueous phase, and in particular to reach degrees of substitution (or nitrogen levels) well above the values previously stated, without there being the slightest risk of an even partial gelatinization.

The method according to the present invention consists in a method for the cationization of a legume-derived starch, consisting of the reaction of the starch, in a granular or gelatinized form, with a cationic reagent, characterized in that the reaction is carried out in the sole presence of water, and in the complete absence of any other solvent compound, under conditions such that the ratio R of the quantity of water to the quantity of legume-derived starch is between 1/1000 and 10/1.

The expression "quantity of legume-derived starch" is understood to mean the weight of legume-derived starch initially used for the cationization reaction, in particular before any optional step of suspension or gelatinization. This weight comprises the weight of water intrinsically contained in this initial starch. This weight of water represents less than 20%, generally from 5 to 18%, and most often from 10 to 15% of the initial starch weight used.

The expression "quantity of water" is understood to mean the weight of all the water added to the initial starch for its cationization, without taking into account the water intrinsically contained in said starch. This water may be added according to multiple variants, all at once or in several portions, concomitantly or not, to any of the other components of the resulting reaction medium. This quantity of water comprises the water optionally used to:
prepare a starch milk or paste from the initial legume-derived starch,
dilute the cationic reagent, the alkaline agent and/or any other product used for the cationization reaction.

The method according to the invention is, more interestingly still, characterized in that the cationization reaction is carried out in the presence of limited quantities of water, corresponding to a ratio R of between 1/1000 and 1/2.

A method according to the invention, of even greater interest, is characterized in that the cationization reaction is carried out in a so-called dry phase, that is in the presence of quantities of water considered to be very small, corresponding to a ratio R of between 1/1000 and 1/5. This ratio may be in particular between 1/500 and 1/10.

Advantageously, in the cationization method of the present invention, the reaction of the starch with a cationic reagent is carried out in the presence of an alkaline agent.

Preferably, the reaction of the starch with a cationic reagent of the cationization method of the invention is carried out at a pH equal to or greater than 8, preferably greater than 10.

The method according to the invention is advantageously characterized in that the cationic reagent is a tertiary amine or a quaternary ammonium salt.

The method according to the invention makes it possible to prepare a legume-derived cationic starch, characterized in that it has a nitrogen level of between 0.1 and 4%, preferably between 0.3 and 2%.

More particularly, the method according to the invention provides a legume-derived cationic starch having a relatively high nitrogen level, that is between 0.4 and 1.8%, preferably between 0.5 and 1.5%.

In view of the above, the applicant company in fact considers that a cationic legume-derived starch having a nitrogen level at least equal to 0.5%, in particular of between 0.5 and 1.5%, constitutes a novel industrial product.

Such a starch, and more generally any legume-derived cationic starch according to the present invention, is useful in particular, in its soluble form, as an additive in the preparation of compositions of sizing agents used in paper-making, which are reactive with cellulose, such as alkenylsuccinic acid anhydrides (ASA) and alkylketene dimers (AKD), or not.

It may be recommended, still in soluble form, in the preparation of compositions containing optical brighteners, dyes and/or synthetic polymers, in particular polyacrylamides or polyvinylamines.

It is also usefully added in dilute or pulverized paste form as an additive at the wet end of a paper-making machine, alone or in combination with other agents, in particular anionic starches as described for example in European patent EP 0 282 415 or in international patent application WO 00/75425, filed by the applicant, as an agent for the retention of fine fibers and of fillers, in particular inorganic fillers, or as a dewatering agent and/or for improving the physical characteristics of papers.

It can also be used in the production of a particular, especially aqueous starchy composition containing at least one solubilized, legume-derived cationic starch, said cationic starch preferably having a weight-average molecular mass of less than 50 million daltons, preferably less than 5 million daltons, obtained by a hydrolysis treatment carried out before, during and/or after its cationization, preferably after its cationization.

Said starchy composition, in particular aqueous starchy composition, thus obtained is then useful as an agent for reducing interfering substances contained in water circuits and/or retained on process equipment, in particular for paper-making.

Thus, the legume-, in particular pea-, derived cationic starch is of interest in any method for the manufacture of paper, characterized in that it uses said cationic starch (or any starchy composition containing it) in the preparation circuits and/or the circuits of the wet end of a paper-making machine, in particular via a sizing composition, a composition containing at least one agent selected from optical brighteners, dyes and synthetic polymers, in particular polyacrylamides and polyvinylamines, a composition useful as an agent for reducing interfering substances contained in water circuits and/or retained on process equipment, in particular paper-making equipment, and/or directly inside the cellulosic paste suspension, in the form of a dilute aqueous paste, as an agent for retaining fines and fillers, in particular inorganic fillers, for dewatering and/or for improving the physical characteristics of paper.

It further relates to any folding cardboard or paper obtained by any method involving, in these various respects, a legume-derived cationic starch according to the invention (or any starchy composition containing it) and capable of containing said cationic starch.

It has been observed in particular that, contrary to the assertions of the prior art, it was possible to modify a legume, in particular pea, starch with a cationic reagent, regardless of its origin and, in particular, regardless of its amylose content.

Preferably, the amylose content of the legume starch is greater than 30%.

Indeed, observation has shown that, under these more specific conditions in particular, any gelification, even partial, in aqueous medium could be avoided, this being even in the context of the attachment of a large number of cationic groups, corresponding to high DS values and nitrogen levels.

The cationization reaction of legume starch consists in introducing a cationic group into the starch and is carried out by chemical reaction, by condensing a cationic reagent with a hydroxyl group of the starch.

The cationization reaction may be carried out in a manner known per se, with the aid of cationic reagents as described for example in "Starch Chemistry and Technology"—Vol. II—Chapter XVI—R. L. WHISTLER and E. F. PASCHALL—Academic Press (1967).

The reaction may be carried out in an aqueous phase, the starch being provided in general in granular or gelatinized form, the temperature, time and catalysis conditions being well known to any person skilled in the art.

In parallel, the reaction may be carried out in a dry phase, in the same granular or gelatinized forms.

Preferably, the cationization reaction is carried out on a starch in granular form, in an alkaline medium and with nitrogenous reagents based on tertiary amines or quaternary ammonium salts.

According to an advantageous embodiment, the cationic reagent is in the epoxy form or the chloro form corresponding respectively to the following formulae:

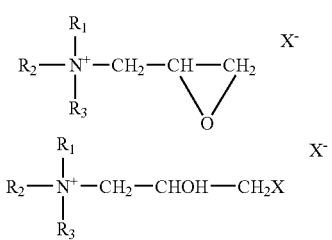

corresponding to tertiary or quaternary derivatives depending on whether one of the substituents of the nitrogen atom is hydrogen or not, said substituents being, insofar as they are not a hydrogen atom, preferably identical and selected from methyl or ethyl radicals, X being Cl, Br or I and $X^-$ being $Cl^-$, $Br^-$ or $I^-$.

The cationic reagent corresponds to one of the two formulae reproduced above in which $R_1$, $R_2$ and $R_3$ are additionally preferably identical and selected from methyl and ethyl radicals, it being possible for one of the substituents $R_1$, $R_2$ or $R_3$ to be a hydrogen atom.

Among these reagents, it is preferable to use 2-dialkylaminochloroethane hydrochlorides such as 2-diethylaminochloroethane hydrochloride or glycidyl-trimethylammonium halides and their halohydrins, such as N-(3-chloro-2-hydroxypropyl)trimethylammonium chloride, the latter reagent being preferred. The amounts of reagent used are then selected such that the resulting cationic starches have the desired nitrogen level.

The legume-derived cationic starches thus obtained have good capacity for dissolution by any continuous or batch, thermal or thermomechanical means, in particular using live steam, and/or by chemical means, in particular by means of an alkaline agent.

Legume-, in particular pea-, derived cationic starches whose amylose content is between 30 and 60% are more particularly preferred.

Under these conditions, the solutions are easily prepared and then exhibit very satisfactory rheological properties. The retrogradation behavior in particular is remarkable.

Legume-derived cationic starches whose amylose content is greater than 60% are however not excluded. The conditions for preparing the solutions will only be slightly more vigorous, without being unacceptable.

More precisely, and with regard to considerations relating to the amylose levels and to the degrees of substitution, it is possible to suggest, for example, taking into account the ease of supply of legume, in particular pea, starches, to preferably combine a high amylose level, which is a factor in the increase in the gelatinization point, in particular under alkaline conditions, and a high DS, which is a factor involved in its reduction.

By contrast, it is possible to envisage and favor a relatively low DS for a low amylose level.

Such considerations are in fact accompanied by other possibilities offered by taking into account starches that have been modified, in particular beforehand, such as hydrolyzed, oxidized, esterified, etherified or crosslinked legume-, in particular pea-, derived starches which can advantageously replace native starches for the cationization.

In this context, in particular, the cationic products in accordance with the invention or obtained according to the method of the invention may be amphoteric starches, that is to say starches which may have, in addition to the cationic groups which are the main subject of the invention, anionic groups, in particular phosphated groups, that are natural and/or supplied, sulfonated groups, carboxymethylated groups, sulfated groups, succinylated, in particular sulfo-succinylated, groups, as recommended in particular in European patent EP 282 415, in the name of the applicant.

It is also possible to advantageously attach hydrophobic anionic groups, in particular by esterification with a dicarboxylic acid anhydride, in particular, that is branched, as is described in European patent EP 742 316, or that is modified by n-alkenylsuccinylation, in particular by n-octenyl-succinylation or n-dodecylsuccinylation, as described in European patent EP 786 476, both in the name of the applicant.

More particularly also, the crosslinking, by any means known to a person skilled in the art, is a parameter of choice for ensuring that the cationization reaction proceeds without any risk of gelatinization or even of a more limited but potentially harmful manifestation such as a mere swelling of the starch.

The applicant company in fact considers that the cationic legume starches according to the present invention, including those whose nitrogen level is at least equal to 0.5%, and which are additionally crosslinked, also constitute novel industrial products that are particularly of interest in the paper-making sector.

The crosslinking step may have been carried out beforehand, simultaneously and/or after the cationization step.

The use of the cationic starches according to the invention on a paper-making machine, under the usual conditions for adding a dilute paste, either at a point close to the headbox, but also for incorporation further upstream of the circuit or for spraying, alone or in combination with other agents, in particular anionic starches as described for example in European patent EP 0 282 415 or International patent application WO 00/75425, filed by the applicant, good retention of the fine fibers and of the fillers, in particular inorganic fillers, is noted accompanied by good dewatering indicated in particular by efficient machine speeds.

The traditional physical characteristics such as tensile strength (LR), bursting strength (Müllen Index), tear strength or the stiffness are, without any other variation, capable of satisfying persons skilled in the art, in particular compared with other cationic cereal or tuber starches.

The same applies to the optical properties such as for example the whiteness and the opacity, for the surface properties such as the smoothness or the roughness, and for the so-called printability.

The quantities of cationic starch according to the invention, that are introduced into the circuits for preparation and/or of the wet end of a paper-making machine, either into the suspension of cellulosic paste, in the form of a dilute aqueous paste, as an agent for the retention of fines and of fillers, in particular inorganic fillers, for dewatering and/or for improving the physical characteristics of the paper, are determined according to the characteristics sought or favored by persons skilled in the art compared in particular with the cellulosic paste used, the aqueous medium and its environment.

They are equivalent, at the same degree of substitution, to the quantities of cereal- or tuber-derived cationic starches used.

In this regard, the applicant company emphasizes that the crosslinked or noncrosslinked cationic legume starches according to the invention may, if desired, be combined with cereal- and/or tuber-derived starches, in particular with crosslinked or noncrosslinked cereal- and/or tuber-derived cationic starches intended for the paper-making sector.

This combination may be made in particular through starchy compositions consisting of mixtures provided in any forms (solid, pasty or liquid) and combining, in any proportions, at least one cationic legume-derived starch according to the invention and at least one, preferably cationic, cereal- or tuber-derived starch.

Likewise, the cationic legume-derived starch in accordance with the invention may be combined with an anionic starch, said anionic starch being derived from cereals, tubers and/or legumes.

This combination may be in the form described in European patent EP 282 415 by which said cationic starch, on the one hand, and said anionic starch, on the other hand, are introduced into the fibrous composition, at two or more points of the paper-making plant, separately from each other.

It is also advantageously expressed by novel starchy compositions containing at least one legume-derived cationic starch in accordance with the invention and at least one anionic starch, said anionic starch being preferably derived from cereals, tubers and/or legumes.

Such combinations, which correspond in particular to those described in French patent FR 2 794 479, in the name of the applicant, have however, compared with the compositions described therein, significant advantages as appears in examples 11, 12 and 15.

Example 11 shows the benefit of compositions comprising 75% of a cationic, in particular crosslinked, pea starch, and 25% of an anionic corn starch, in particular in terms of dewatering and physical characteristics.

Example 12 demonstrates the excellent properties presented by a composition containing a cationic pea starch and an anionic pea starch, in proportions identical to the preceding ones.

The anionic pea starch may be advantageously succinylated or sulfosuccinylated, this being with a degree of substitution (DS) of between 0.01 and 1, in particular between 0.02 and 0.50.

The applicant company considers, in this regard, that numerous anionic legume starches are novel products. That is in particular the case for the sulfo-succinylated derivatives.

Example 15 aims to demonstrate that the proportions can be significantly varied. For a 55/45 ratio, the efficiencies remain completely satisfactory.

Whether the combination is in conformity with the description of either of the two patents cited above, European patent EP 282 415 or FR 2 794 479, the anionic starch may, apart from being derived from various botanical sources, contain various groups selected from phosphated groups that are natural and/or supplied, sulfonated groups, carboxymethylated groups, sulfated groups, succinylated groups, especially that are sulfosuccinylated, and hydrophobic groups, especially esters of a dicarboxylic acid, in particular that is branched, or that are n-alkenylsuccinylated, especially n-octenylsuccinylated or n-dodecyl-succinylated.

The various starches described form an integral part of the present invention.

In another respect, it has been observed that the cationic starches according to the invention are particularly suitable for the production of emulsions or dispersions of all sorts of sizing agents, whether they are reactive with cellulose, such as in particular ketene dimers or ketene multimers, acid anhydrides, in particular succinic anhydrides, organic isocyanates; or nonreactive such as rosins or derivatives thereof, fatty acids and derivatives thereof, acidic resins, esters or amides thereof, waxes and derivatives thereof, and the various mixtures of agents.

The behavior of the cationic starches according to the invention for this use is remarkable, in terms of stability of the pastes at the concentrations used, of efficiencies during the emulsification or dispersion of said sizing agents, of stability of said emulsions or dispersions in concentrated form, suitable for storage, for some of them, or in dilute form, suitable for use for the great majority.

Likewise, the cationic starches according to the invention are particularly suitable for the preparation of compositions containing at least one agent chosen from optical brighteners, dyes and synthetic polymers such as for example polyacrylamides and polyvinylamines.

In another context, it was observed that the cationic starches according to the invention could be suitable for the production of particular compositions such as those designated in the present invention as "secondary additive for paper-making" which is useful as agent for reducing interfering substances, in particular of anionic nature, which are contained in water circuits and/or retained on paper-making process equipment or as "additive for the treatment of water for industrial use", which is useful for the clarification and/or purification of water derived from human or industrial activities or intended for said activities.

The hydrolysis treatment performed may advantageously consist of an acid hydrolysis, in particular with hydrochloric acid, or more advantageously still of an enzymatic hydrolysis, with at least one enzyme chosen in particular from amylases, in particular α-amylases, and transferases, in particular cyclodextrin glycosyltransferases and branching enzymes.

The various aspects of the present invention, relating to the production of cationic starches according to the invention and to their behavior in the paper-making application will now be described in greater detail with the aid of examples which are not at all limiting.

The applicant company also observed that such legume-derived cationic starches, and various compositions containing them, may be useful, for example, as flocculating, viscosity-promoting, rheology-modifying, agglomerating or encapsulating agents, in other fields of application such as those of the chemical or detergent industries, hydraulic binders, facing products such as plaster and coatings, extraction of ores, drilling, labeling, cosmetics, paints and varnish, inks, adhesive compositions in general or thermoplastic materials.

EXAMPLE 1

Slurry Phase Cationization

A pea starch is available whose amylose content is 36.7% and the intrinsic water content is about 12%. Starting with this initial starch, an aqueous slurry containing 35% dry matter content is prepared which is brought to a temperature of 39° C.

13.8% of a solution containing 50% 3-chloro-2-hydroxypropyltrimethylammonium chloride is added thereto, this percentage expressing the quantity of said solution expressed relative to the initial starch.

The preparation is then brought into an alkaline medium with 2.7% of dry sodium hydroxide relative to the initial starch, added in the form of a solution at 35 g/l.

A starting reaction medium is thus obtained which has a ratio R as defined above of the order of about 2.35/1.

The reaction is maintained for 15 hours.

It is stopped by neutralizing with commercial hydrochloric acid to a pH of 7 (±0.5).

The medium is filtered and dried.

A cationic pea starch is thus obtained which has a fixed nitrogen level of 0.43%, corresponding to a degree of substitution (DS) of 0.052.

EXAMPLE 2

Dry Cationization

Using a fast mixer of the LODIGE CB type make, the following are mixed in the most homogeneous manner:
the initial pea starch as described in example 1,
11.04% of a solution containing 50% 3-chloro-2-hydroxypropyltrimethylammonium chloride, expressed relative to the initial starch used, and
1.73% of dry sodium hydroxide relative to the initial starch, in the form of a 50% solution.

The mixture obtained (R=1/15.7) is then reheated to about 65° C. and kept in a maturation unit for 6 to 7 hours.

After cationization, a 50% citric acid solution is then spread over the reaction mixture, at the outlet of the maturation unit, in an amount of 1.2% of said solution expressed relative to the commercial material.

A cationic pea starch is thus obtained which has a fixed nitrogen level of 0.39%, corresponding to a degree of substitution (DS) of 0.047.

EXAMPLE 3

A cationic starch according to the invention was prepared from a pea starch having an amylose content of 36.7% and called AP1, for a nitrogen level of 0.44%.

A second one was prepared from a pea starch of the same amylose content but, furthermore, crosslinked with 30 parts per million (30 ppm) of sodium trimetaphosphate, and called APR1, for an identical, fixed nitrogen level of 0.44%.

They are compared to four products obtained according to the prior art, that is a cationic corn starch AM1, a crosslinked, 50/50 cationic mixture of corn starch and potato starch AMPR1, two potato starches of different cationicities FP1 and FP2, having a fixed nitrogen level of 0.63%, 0.55%, 0.37% and 0.65%, respectively.

Pastes are prepared in a "Jet-Cooker", that is continuously, for 1 minute at 120° C., and such that their final dry solids content is 2%.

They are, in this form, subjected to rheological evaluation in the "CARRI-MED CSL$^2$500" rheometer, in coaxial geometries 13.83/15 mm, on a temperature ramp of 60° C. to 5° C. over 75 minutes.

The sinusoidal stress frequency is set at F=1 Hz, the stress at 20 μN·m.

The method makes it possible to estimate the stability of the pastes to cooling by evaluating their temperature for conversion from a true solution to a gel, corresponding to the retrogradation temperature, by monitoring the elastic and viscous moduli.

|  | % Nitrogen | Temperature sol/gel |
| --- | --- | --- |
| FP1 | 0.37 | Less than 5° C. |
| FP2 | 0.65 | Less than 5° C. |
| AP1 | 0.44 | Less than 5° C. |
| APR1 | 0.44 | Less than 5° C. |
| AM1 | 0.63 | Greater than 60° C. |

In a particularly surprising and unexpected manner, given their relatively high amylose content in particular, the cationic pea starch pastes have a remarkable stability to cooling.

Indeed, like cationic potato starch pastes, they do not undergo retrogradation over the range of temperatures considered, from 60 to 5° C.

EXAMPLE 4

Pastes are again prepared as performed in example 3, that is in a "Jet-Cooker", for a final dry matter content of 2%.

The "CARRI-MED CSL$^2$500" rheometer is again used in coaxial geometries 13.83/15 mm.

This time, the viscosities are evaluated as a rising curve, at 500 s$^{-2}$ and at 10 s$^{-2}$, respectively, in a cycle during which the apparatus is thermostated at 60° C. and the ratio Rc=Viscosity rising curve at 500 s$^{-2}$/Viscosity curve at 10 s$^{-2}$.

The following values are recorded:

|  | Rc |
| --- | --- |
| FP1 | 0.300 |
| FP2 | 0.386 |
| AP1 | 0.413 |
| APR1 | 0.420 |
| AM1 | 0.157 |

High Rc values make it possible to predict good shear resistance and in particular excellent performance under subsequent mechanical stress. That is quite obviously the case with cationic pea starches, whether they are crosslinked or not, since they show substantially higher values than those obtained with cereal or tuber starches.

EXAMPLE 5

Pastes are prepared in a "Jet-Cooker", that is continuously, for 1 minute at 120° C., but the final dry solids content is now 4%.

Starting with each of them, emulsions are prepared in a laboratory in a "Bol CENCO" at a speed of 20 000 revolutions per minute (rpm), for 5 minutes at 50° C., with a C18 alkenyl succinic acid anhydride, in a cationic starch/ASA ratio R1 equal to 0.4.

The emulsions obtained are diluted 10 fold with a paste of the same cationic starch so that, in particular, the cationic starch/ASA ratio R2 is equal to 0.8 and their stability is observed.

After storing said dilute emulsions for 24 hours at room temperature, it is observed, and in a perfectly obvious manner, that the two crosslinked or noncrosslinked cationic pea starch-based preparations are stable, while the cationic corn- or potato starch-based emulsions are not.

EXAMPLE 6

The dilute emulsions obtained in the preceding example 5 are used, for internal sizing of a paper, in a supply consisting of 80% bleached kraft pulp and 20% coated broke, in an amount of 0.25% dry matter relative to the dry pulp.

The suspension thus obtained then receives 30% calcium carbonate calculated relative to the dry pulp, and then 0.6% of the same bulk cationic starch.

The following values are recorded, for the operation of the machine and for the sizing:

|  | % Nitrogen | Retention cloth (%) | Retention fillers (%) | Cobb (g/m$^2$) |
|---|---|---|---|---|
| FP1 | 0.37 | 87.6 | 73.9 | 26 |
| FP2 | 0.65 | 87 | 76.8 | 24 |
| AP1 | 0.44 | 84.8 | 72.8 | 26 |
| APR1 | 0.44 | 85.2 | 72.1 | 27 |
| AM1 | 0.63 | 86.6 | 74 | 31.4 |

The measurements of Cobb sizing show that the behavior of the cationic pea starch is very similar from this point of view to that of the cationic potato starch and quite superior to that of the cationic corn starch.

To summarize, if account is taken of the stability of the pastes, of the stability of the emulsions, of the sizing characteristics observed, the cationic pea starches show particularly advantageous efficiencies from these points of view.

EXAMPLE 7

The aim, in this case, is to study the influence of long contacts when the cationic starches are introduced at a point situated upstream of the circuit.

For that, the cooking conditions of example 3 are repeated and the AP1 and AMPR1 products are directly compared when they are introduced into a pulp consisting of 52% of resinous pulp and 48% of foliage pulp, which has received in addition 61% of broke expressed relative to the resinous+ foliage combination.

The dose envisaged is 1.2% of dry cationic starch relative to the whole pulp.

The contact time between the pulp and the cationic starch is 6 minutes, according to a sequence during which the shearings are intense.

The shearing strength of the cationic starches and the ability to maintain the interfiber linkages are assessed by the "Scott-Bond" test which is well known to persons skilled in the art.

|  | Internal cohesion (Scott-Bond) |
|---|---|
| 1.2% AMPR1 | 230 J/m$^2$ |
| 1.2% AP1 | 255 J/m$^2$ |
| without cationic starch | 180 J/m$^2$ |

The cationic pea starch significantly improves the internal cohesion, in particular compared with the effect of a cationic mixture of corn starch and potato starch (50/50).

An explanation for this may be found in particular in example 4 expressing the preservation of the viscous character of the cationic pea starch paste.

In any case, this aspect, combined with the shearing straight capacity, would be capable of leading to a very good dispersion of the cationic starch and of strengthening the interfiber linkage potential.

EXAMPLE 8

In this new example, the principle of the long contact time is only partially preserved, by considering two points of addition of cationic pea starch according to the invention, one upstream (0.6%), for a contact time of 5 minutes, the other at the inlet of the headbox (0.3%), compared with a cationic corn starch and, as in example 7, with a cationic mixture of corn starch and potato starch.

Moreover, the cationic pea starch is used for the preparation of an emulsion with alkenylsuccinic acid anhydride in a manner similar to that used in example 5.

The same fibrous composition as that in example 6 and the same amount of fillers (calcium carbonate) are used on these new bases.

The following results are recorded:

| 0.6% + 0.3% of cationic starch | Cobb 60 sizing | Internal cohesion |
|---|---|---|
| AM1 | 23 | 165 |
| AMPR1 | 22 | 165 |
| AP1 | 19 | 185 |
| APR1 | 19 | 180 |
| without | 38 | 130 |

The cationic pea starch added to the bulk provides, all other conditions being equal, compared with prior art products, a better hydrophobic character and increases the resistance of the paper to delamination.

EXAMPLE 9

The compositions of example 8 are used. In the very first step, measurements of dewatering are performed on the suspensions of pulp having received a paste of a cationic starch according to the invention or a paste of cationic starch according to the prior art.

| 0.6% + 0.3% of cationic starch | Dewatering time (in seconds) |
|---|---|
| FP1 | 10.6 |
| AMPR1 | 10.17 |
| AP1 | 9.93 |
| APR1 | 7.8 |

The dewatering time decreases substantially with the use of cationic starch according to the invention, compared with cationic products of the prior art.

That is most particularly the case with a cationic crosslinked pea starch (APR1).

EXAMPLE 10

Starting with the same initial pea starch as that described in the preceding examples, the following were respectively prepared in accordance with the invention:

a cationic pea starch having a nitrogen level of 0.55% and obtained from a reaction mixture whose ratio R was adjusted to about 2/1, a cationic pea starch having a nitrogen level of 0.63% and obtained from a reaction mixture whose ratio R was adjusted to about 1/15.

These products proved to be as efficient, or even more efficient for certain aspects, not only than the cationic legume starches described in the preceding examples, but also than the potato starch FP2 described above.

In particular, these two products made it possible to obtain:

stable emulsions of sizing agents having, in terms of Cobb sizing, efficiencies equal to or exceeding those described for the potato starch FP2 in example 6, efficiencies in terms of Cobb sizing and internal cohesion which are further improved compared with those described in example 8, efficiencies in terms of dewatering which are superior to those moreover obtained with said starch FP2.

This example not only shows that it is now possible to prepare cationic legume-derived starches having a nitrogen level at least equal to 0.5%, but that in addition such novel products make it possible to achieve, in the paper-making sector in general and in particular in the preparation of sizing agents and/or in the wet end of the paper-making machine, remarkable efficiencies which the prior art did not at all make it possible to imagine.

EXAMPLE 11

Various cationization reactions are performed on native pea starches, collected from a batch having an amylose content of 35.3%, according to the so-called dry procedure disclosed in example 2. Some of them are in addition subsequently crosslinked with sodium trimetaphosphate (TMPNa).

Three cationic derivatives of pea starch are available:
ref. 073: 0.67% of nitrogen,
ref. 074: 0.68% of nitrogen—crosslinked with 40 ppm (parts per million) of TMPNa,
ref. 076: 0.67% of nitrogen—crosslinked with 80 ppm of TMPNa Each of them is the subject, compared with HI-CAT®1286A, a cationic potato starch marketed by the applicant company, of a combination of 75 parts of cationic starch per 25 parts of VECTOR®A080, a corn starch with an anionic character marketed by the applicant company.

Various pairs are obtained:
$C_1$: 75% HI-CAT®1286A+25% VECTOR®A080,
$C_2$: 75% 073+25% VECTOR®A080,
$C_3$: 75% 074+25% VECTOR®A080,
$C_4$: 75% 076+25% VECTOR®A080, are compared after mixing and simultaneously cooking the two components, in accordance with international patent application WO 00/75425. A continuous cooking appliance (Jet-Cooker) is used. The various parameters are:

cooking temperature: 120° C.,
time: 1 minute,
hardness of the water: 10° TH,
dry solids content: slurry: 10%, final: 2%.

Each pair is added to a pulp of old paper, in an amount of 2%, with the aim of improving the dewatering of this pulp judged to be "clogging", while preserving the physical properties of the paper obtained.

| | | Physical tests | | | |
|---|---|---|---|---|---|
| | Dewatering | Weight $g/m^2$ | Scott-Bond $J/m^2$ | Burst factor $kPa/g/m^2$ | Ash at 450° C. (%) |
| $C_1$ | 19.55 | 124 | 318 | 2.50 | 7.0 |
| $C_2$ | 19.61 | 123.5 | 319 | 2.51 | 6.6 |
| $C_3$ | 19.93 | 125.5 | 312 | 2.45 | 6.35 |
| $C_4$ | 18.49 | 123 | 321 | 2.55 | 5.8 |

The aim is easily achieved with the sample having the reference 076, that is corresponding to the cationic pea starch which was subjected to the highest degree of crosslinking.

EXAMPLE 12

Upon these observations, additional tests are undertaken under the same conditions of cooking and adding to a pulp similar to that of example 11.

A mixture ($C_5$) of cationic pea starch and of anionic pea starch (75/25) is subjected to the same pair HI-CAT®1286A/VECTOR®A080.

For that, there is prepared, from a native pea starch collected from the batch containing 35.3% of amylose, a sulfo-carboxyalkylated derivative (ref. A) according to the teachings of European patent EP 0 282 415, using maleic anhydride.

The pea starch slurry containing 34% dry solids content and at 25° C. is placed in a slightly oxidizing medium and regulated at pH 6.5 with sodium hydroxide. It receives 4.7% anhydrous monosodium phosphate (dry/dry).

Next, under conditions of pH regulated at 7.0, 5.9% (dry/dry) of maleic anhydride is added over a period of 3 hours and 30 minutes. Beyond this time, the action is again continued for 1 hour.

The slurry is filtered and then readjusted to 36.5% on solids. 6.3% of sodium sulfate is added to it (dry/dry). The pH is adjusted to 8.0.20% of commercial sodium bisulfite is then supplied, calculated relative to the dry starch and left in contact for 10 hours. Finally, the medium is filtered and dried.

Two rates of introduction into the pulp are studied:
2% as before, and 4%, regarded as high:

| | | | Physical tests | | | |
|---|---|---|---|---|---|---|
| | | Dewatering | Weight $g/m^2$ | Scott-Bond $J/m^2$ | Burst factor $kPa/g/m^2$ | Ash at 450° C. (%) |
| 2% | $C_1$ | 18.14 | 124 | 365 | 2.66 | 6.8 |
| | $C_5$ | 17.35 | 122.5 | 332 | 2.74 | 6.5 |
| 4% | $C_1$ | 21.93 | 127 | 421 | 3.03 | 6.9 |
| | $C_5$ | 19.64 | 126 | 416 | 2.82 | 6.65 |

The dewatering efficiencies are confirmed. This property is preserved at the high starch level.

The internal cohesion and, in particular, the burst factor reach very satisfactory values.

EXAMPLE 13

On another furnish containing 100% waste paper, a comparison is made between HI-CAT®5283A, a cationic mixture (0.64% nitrogen) based on cereal starch and tuber starch marketed by the applicant company, on the one hand, and the cationic pea starches ref. 073 and ref. 076, on the other hand, by adding them to said pulp in an amount of 1%.

The comparative data, in the wet end of the machine, are the following:

|  | Total retention (in %) | Retention of the fillers (in %) | Dewatering (Akribi) |
| --- | --- | --- | --- |
| HI-CAT ® 5283A | 83.1 | 70.4 | 15.7 |
| Ref. 076 | 82.9 | 71.9 | 16.1 |
| Ref. 073 | 82.7 | 71.5 | 15.2 |

The differences at this level of 1% are low.

The main characteristics were assessed on the papers:

|  | Weight (g/m$^2$) | Scott-Bond (J/m$^2$) | Burst factor (kPa/g/m$^2$) | Ash at 450° C. (%) |
| --- | --- | --- | --- | --- |
| HI-CAT ® 5283A | 127.0 | 265 | 1.78 | 8.25 |
| Ref. 076 | 127.5 | 290 | 1.84 | 8.40 |
| Ref. 073 | 128.0 | 287 | 1.77 | 8.30 |

The cationic, in particular crosslinked, pea starch makes it possible to obtain, for similar operating conditions, better physical characteristics.

EXAMPLE 14

The procedure is carried out as in example 13, with the same products and the same pulp, but at a substantially higher level of introduction, that is 3%.

In the wet end of the machine, the following are observed:

|  | Total retention (in %) | Retention of the fillers (in %) | Dewatering (Akribi) |
| --- | --- | --- | --- |
| HI-CAT ® 5283A | 84.0 | 72.2 | 19.5 |
| Ref. 076 | 84.1 | 73.2 | 18.1 |
| Ref. 073 | 84.0 | 73.0 | 18.2 |

Besides the tendency toward a better retention of the fillers, a better dewatering is noted, with the cationic pea starches, at this high level of introduction.

Characteristics of the Paper:

|  | Weight (g/m$^2$) | Scott-Bond (J/m$^2$) | Burst factor (kPa/g/m$^2$) | Ash at 450° C. (%) |
| --- | --- | --- | --- | --- |
| HI-CAT ® 5283A | 128.0 | 327 | 1.80 | 8.30 |
| Ref. 076 | 129.0 | 325 | 2.00 | 8.40 |
| Ref. 073 | 129.5 | 323 | 1.90 | 8.30 |

The high level of introduction (3.5%) is beneficial to the burst factor of the paper.

EXAMPLE 15

A novel cationic pea starch is prepared as defined in example 11, that is ref. 078: 0.8% of nitrogen—crosslinked with 80 ppm of TMPNa.

Using this derivative according to the invention and cationic products of the prior art, mixtures are prepared as described in example 11 but this time in a ratio corresponding to 55% of cationic starch per 45% of anionic starch.

The various pairs obtained:
$D_1$: 55% ref. 078+45% VECTOR®A080,
$D_2$: 55% ref. 078+45% sulfosuccinylated anionic pea starch with DS 0.052,
$D'_2$: 55% ref. 078+45% succinylated anionic pea starch with DS 0.051,
$D_3$: 55% 074+45% VECTOR®AS104 marketed by the applicant company,
$D_4$: 55% cationic mixture (cereal+tuber–0.73% of nitrogen)+45% VECTOR®A080,
are compared as disclosed in example 11, after simultaneous cooking of the two components.

Each pair is added to the pulp containing 100% of old paper of examples 13 and 14, in an amount of 3.5% and the controls and measurements described are performed:

Measurements in the wet end of the machine:

|  | Total retention (in %) | Retention of the fillers (in %) | Dewatering (Akribi) |
| --- | --- | --- | --- |
| $D_1$ | 83.0 | 72.1 | 14.6 |
| $D_2$ | 83.0 | 71.6 | 14.0 |
| $D'_2$ | 83.2 | 72.0 | 14.1 |
| $D_3$ | 84.5 | 73.1 | 18.0 |
| $D_4$ | 82.9 | 71.5 | 13.0 |

While $D_3$ exhibits unacceptable dewatering efficiencies, the other mixtures tested have similar behaviors, in particular $D_2$ and $D'_2$ prepared exclusively from pea starch derivatives.

Characteristics of the Paper:

|  | Weight (g/m$^2$) | Scott-Bond (J/m$^2$) | Burst factor (kPa/g/m$^2$) | Ash at 450° C. (%) |
| --- | --- | --- | --- | --- |
| $D_1$ | 127.0 | 300 | 1.80 | 8.4 |
| $D_2$ | 126.8 | 295 | 1.75 | 8.2 |
| $D'_2$ | 127.2 | 300 | 1.80 | 8.1 |
| $D_3$ | 127.0 | 305 | 1.92 | 8.5 |
| $D_4$ | 127.3 | 300 | 1.67 | 8.3 |

The pair $D_1$, combining cationic pea starch and anionic corn starch, confers physical properties which are all the more advantageous since they can be compared with a remarkable behavior on a machine.

What is claimed is:

1. A method for the manufacture of folding cardboard or paper, comprising the steps:
    selecting a paper-making machine;
    selecting a pulp;
    selecting at least one additive comprising at least one pea-derived cationic starch having a nitrogen level of between 0.5 and 4% and an amylose content of 30% to 60%;
    preparing folding cardboard or paper from said pulp on said paper-making machine, utilizing said additive; and
    collecting said folding cardboard or paper.

2. The method as claimed in claim 1, wherein the pea derived cationic starch has a nitrogen level of between 0.5 and 2%.

3. The method as claimed in claim 1, wherein the pea derived cationic starch has a nitrogen level of between 0.5 and 1.8%.

4. The method as claimed in claim 1, wherein the pea derived cationic starch has a nitrogen level of between 0.5 and 1.5%.

5. The method as claimed in claim 1, wherein the pea derived cationic starch is cross-linked.

6. The method as claimed in claim 1, wherein the pea derived cationic starch is amphoteric.

7. The method as claimed in claim 1, wherein the pea derived cationic starch is obtained by a method for the cationization of a pea-derived starch, comprising the reaction of said pea-derived starch, in a granular or gelatinized form, with a cationic reagent, wherein the reaction is carried out in the sole presence of water, and in the complete absence of any other solvent compound, under conditions such that the ratio R of the quantity of water to the quantity of said pea-derived starch is between 1/1000 and 10/1, and said pea-derived starch comprises an amylose content of 30% to 60%.

* * * * *